United States Patent [19]
Hikosaka et al.

[11] Patent Number: 5,830,569
[45] Date of Patent: Nov. 3, 1998

[54] MAGNETIC RECORDING MEDIUM CONTAINING COPTO-BASED ALLOY MAGNETIC FILM

[75] Inventors: Takashi Hikosaka, Tokyo; Tsutomu Tanaka, Yokohama, both of Japan

[73] Assignee: Kabushiki Kaisha Toshiba, Kawasaki, Japan

[21] Appl. No.: 858,690

[22] Filed: May 19, 1997

Related U.S. Application Data

[63] Continuation-in-part of Ser. No. 713,202, Sep. 12, 1996, abandoned.

[30] Foreign Application Priority Data

Sep. 12, 1995 [JP] Japan ................................. 7-234353
Mar. 11, 1997 [JP] Japan ................................. 9-056259

[51] Int. Cl.$^6$ ................................. G11B 5/716
[52] U.S. Cl. .................. 428/332; 428/336; 428/678; 428/457; 428/469; 428/694 TM; 428/694 T; 428/694 TS
[58] Field of Search .................. 428/694 TS, 694 T, 428/457, 469, 694 TM, 332, 336, 678

[56] References Cited

U.S. PATENT DOCUMENTS

| | | | |
|---|---|---|---|
| 4,652,499 | 3/1987 | Howard | 428/694 TS |
| 5,051,288 | 9/1991 | Ahlert et al. | 428/694 TM |
| 5,066,552 | 11/1991 | Howard et al. | 428/694 T |

*Primary Examiner*—Christopher D. Rodee
*Attorney, Agent, or Firm*—Oblon, Spivak, McClelland, Maier & Neustadt, P.C.

[57] ABSTRACT

A magnetic recording medium of this invention includes an underlayer formed on a substrate and made of a material containing vanadium as a main constituent, and a magnetic film formed on the underlayer and made of a CoPtO-based alloy. Another magnetic recording medium of this invention includes a first underlayer formed on a substrate and made of a crystal having a crystal structure for forming a body-centered cubic lattice, a second underlayer formed on the first underlayer and made of an amorphous material, and a magnetic film formed on the second underlayer and made of a CoPtO-based alloy. Further, the magnetic recording medium according to the present invention includes an underlayer formed on a substrate, a plurality of magnetic films laminated on the underlayer and interlayers provided respectively between the plurality of magnetic films, in which the underlayer and the interlayers are made of vanadium or an alloy mainly containing vanadium.

25 Claims, 5 Drawing Sheets

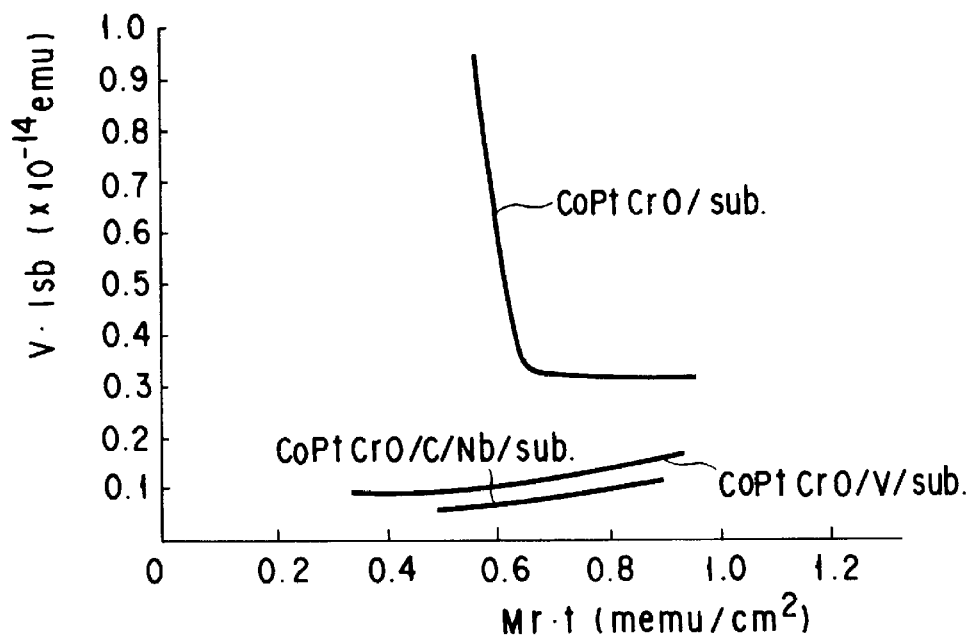
F I G. 2
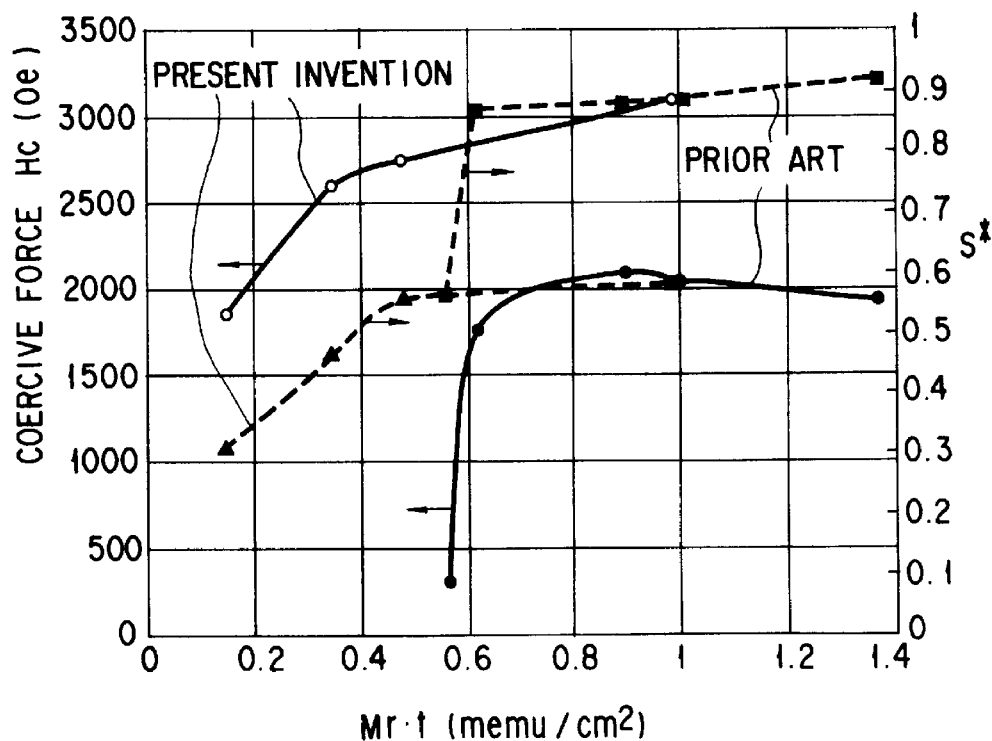
F I G. 3

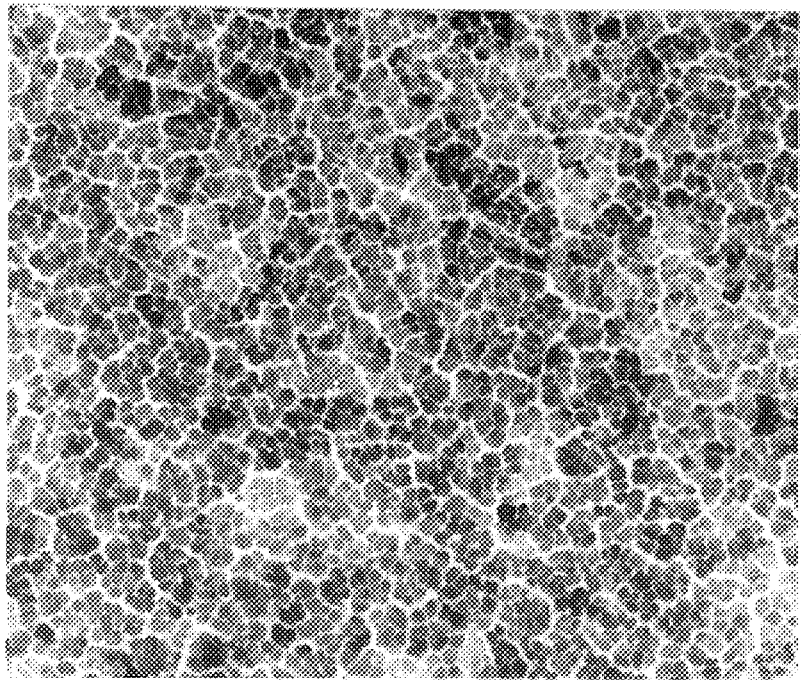
FIG. 8    X 250000
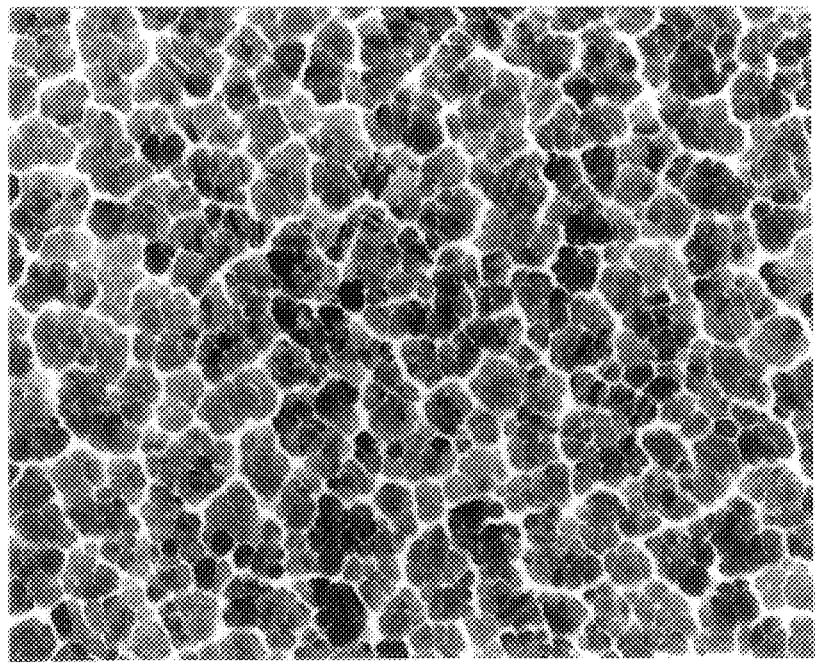
FIG. 9    X 250000

MAGNETIC RECORDING MEDIUM CONTAINING COPTO-BASED ALLOY MAGNETIC FILM

This application is a continuation-in-part of U.S. patent application Ser. No. 08/713,202, filed Sep. 12, 1996, now abandoned, the entire contents of which are incorporated herein by reference.

BACKGROUND OF THE INVENTION

The present invention relates to a magnetic recording medium used in a magnetic recording device such as a hard disk device serving as the external memory of a computer.

Magnetic recording devices are used as high-density recording devices because of their advantages, i.e., the small size, the large capacity, the capability of high-speed access, and the low cost. In recent years, demand has arisen for high-density recording for magnetic recording devices. To meet this demand, magnetic recording media for high-density recording have been studied.

High-density recording can be achieved by the following ways: the coercive force (Hc) of a magnetic film is increased, the magnetic film is made thinner, or the anisotropy of particles constituting the magnetic film is aligned to reduce dispersion of the magnetization inversion field.

As a conventional recording medium for realizing a high coercive force Hc, there are magnetic recording media each of which is constituted by directly forming a CoPt alloy film as a magnetic film on a substrate. For these conventional magnetic recording media, when the thickness of the magnetic film is decreased, the coercive force gradually increases to a level suitable for high-density recording. However, when the film thickness is further decreased, the coercive force abruptly decreases. Therefore, for the conventional magnetic recording media, even when the magnetic film is made thin, an increase in recording density cannot be achieved.

In a magnetic recording medium, a coercive force rectangularity ratio S* of the magnetic film in planar affects the signal quality. An appropriate value for this coercive force rectangularity ratio S* is about 0.4 to 0.8. However, when the film thickness is decreased, the conventional recording media do not exhibit any value within this range.

In a thin magnetic recording medium, magnetic separation between magnetic particles in the magnetic film is effective to achieve high-density recording because it increases the coercive force of the medium and minimizes noise. A value ΔM is used as an index representing the degree of magnetic separation between the magnetic particles. The value ΔM is a parameter with which the degree of magnetic separation in a magnetic recording medium can be evaluated independently of the recording capability of a magnetic head. As the value ΔM becomes smaller, the magnetic recording medium has a large coercive force and low noise.

The state-of-the-art magnetic recording devices use, as magnetic recording media, magnetic films with a coercive force Hc of about 2,000 Oe. Presently, the coercive force Hc of a magnetic recording medium is limited by the recording capability of the magnetic head. However, as the recording capability of a magnetic head is improved, an increase in coercive force Hc of magnetic recording medium is required.

However, in the conventional magnetic recording medium, the value ΔM cannot be sufficiently small. Therefore, the magnetic recording medium constituted by directly forming a CoPtO alloy film on a substrate has a limited coercive force, so high-density recording cannot be achieved.

BRIEF SUMMARY OF THE INVENTION

It is the first object of the present invention to provide a magnetic recording medium which exhibits a large coercive force and an appropriate coercive force rectangularity ratio and is suitable for high-density recording even when the magnetic film is thin, i.e., even when the product of the residual magnetization amount (Mr) of the magnetic film and the thickness (t) of the magnetic film is small.

The first invention of the present invention provides a magnetic recording medium comprising an underlayer formed on a substrate, and a magnetic film formed on the underlayer and made of a CoPtO-based alloy.

The first invention of the present invention also provides a magnetic recording medium comprising an underlayer formed on a substrate, and a magnetic film formed on the underlayer and made of a CoPtO-based alloy, wherein a magnetization amount $v \cdot I_{sb}$ of the magnetic film satisfies $0 < v \cdot I_{sb} \leq 0.3 \times 10^{-14}$ emu.

The first invention of the present invention also provides a magnetic recording medium comprising an underlayer formed on a substrate, and a magnetic film formed on the underlayer and made of a CoPtO-based alloy, wherein a ratio $Hc/(Mr \cdot t)$ $(Oe/(memu/cm^2))$ of a coercive force Hc to a product Mr·t of a residual magnetization amount of the magnetic film in planar and a thickness of the magnetic film is at least 6,000.

Preferably, a ratio $(Mr \cdot t / v \cdot I_{sb})$ of a product Mr·t of a residual magnetization amount of the magnetic film in planar and a thickness of the magnetic film to the magnetization amount $v \cdot I_{sb}$ of the magnetic film is not less than $3.5 \times 10^{11}$ particles/cm$^2$.

The first invention of the present invention also provides a magnetic recording medium comprising an underlayer formed on a substrate, and a magnetic film formed on the underlayer and made of a CoPtO-based alloy, wherein a thickness of the magnetic film is not more than 15 nm, and a coercive force rectangularity ratio S* of the magnetic film in planar is 0.4 to 0.82. Preferably, the underlayer is made of a material containing vanadium as a main constituent.

In the first invention, preferably, a material constituting the substrate is lattice-matched with the CoPtO-based alloy through the underlayer.

In the first invention, preferably, the CoPtO-based alloy constituting the magnetic film contains at least 10 atomic % of oxygen, and the magnetic film has a crystalline phase and an amorphous phase containing oxygen in a larger amount than that in the crystalline phase. In addition, preferably, the magnetic film has a magnetic anisotropy in planar.

It is the second object of the present invention to provide a magnetic recording medium whose magnetic particles in a magnetic film are magnetically separated and which exhibits a large coercive force and is suitable for high-density recording.

The second invention of the present invention provides a magnetic recording medium comprising a first underlayer formed on a substrate and made of a crystal having a crystal structure for forming a body-centered cubic lattice, a second underlayer formed on the first underlayer and made of an amorphous material, and a magnetic film formed on the second underlayer and made of a CoPtO-based alloy.

In the second invention, preferably, the first underlayer is formed on the substrate to form a plurality of islands in order to magnetic separate from the magnetic film. In addition, preferably, a material constituting the first underlayer contains at least one element selected from the group consisting of niobium, vanadium, and chromium, and a material constituting the second underlayer contains at least one element selected from the group consisting of carbon, boron, boron nitride, and silicon dioxide.

It is the third object of the present invention to provide a magnetic recording medium having a multi-layered structure, whose magnetic film exhibits a high coercive force though the film is made thin.

The third invention of the present invention provides a magnetic recording medium comprising an underlayer formed on a substrate, a plurality of magnetic films made of a CoPtO-based alloy and laminated on the underlayer, and interlayers respectively provided between the plurality of magnetic films laminated, wherein the underlayer and the interlayers are made of vanadium or an alloy mainly containing vanadium. In the third invention, preferably, the CoPtO-based alloy contains 5 to 45 atomic % of oxygen, 45 to 85 atomic % of Co and 10 to 40 atomic % of Pt.

In the third invention, at least one of the underlayer and the interlayers should preferably be made of vanadium. Further, in the case where at least one of the underlayer and the interlayers is made of an alloy mainly containing vanadium, such an alloy should preferably contain 30 to 100 atomic % of vanadium. The alloy mainly containing vanadium should preferably contain the material selected from the group consisting of niobium, titanium, tantalum and mixtures thereof.

Furthermore, in the third invention, the thickness of the magnetic film should preferably be 5 to 20 nm.

BRIEF DESCRIPTION OF THE SEVERAL VIEWS OF THE DRAWING

FIG. 2 is a graph showing the magnetization amount of a magnetic film of the magnetic recording medium according to the first invention of the present invention;

FIG. 3 is a graph showing the magnetic characteristics of the magnetic recording medium according to the first invention of the present invention;

FIG. 8 is a photomicrograph showing a conventional magnetic recording medium having only an Nb underlayer;

FIG. 9 is a photomicrograph showing the magnetic recording medium according to the second invention of the present invention, which has a carbon underlayer formed on an Nb underlayer.

DETAILED DESCRIPTION OF THE INVENTION

Figure 1:
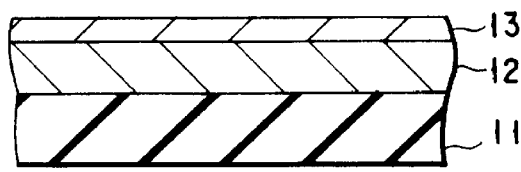
FIG. 1 is a sectional view showing a magnetic recording medium according to the first invention of the present invention.

As shown in FIG. 1, a magnetic recording medium according to the first invention of the present invention has a structure in which a magnetic film 13 is formed on a substrate 11 through an underlayer 12.

In the first invention, a magnetization amount $v \cdot I_{sb}$ of the magnetic film satisfies $0 < v \cdot I_{sb} \leq 0.3 \times 10^{-14}$ emu, and preferably, $0 < v \cdot I_{sb} \leq 0.2 \times 10^{-14}$ emu. This condition is defined to increase the S/N (signal/noise) ratio.

The magnetization amount $v \cdot I_{sb}$ (emu) is calculated as follows. A magnetic field for saturating the magnetic film is applied to the magnetic film, and thereafter, a magnetic field in a direction opposite to that of saturation is applied to the magnetic film. In this state, the magnetization amount is monitored using a vibration sample type magnetometer (VSM), the relationship between the magnetic field (coercive force ΔHc) and a time (sec) until the magnetization amount becomes zero is obtained. Then, the magnetization amount is calculated in accordance with equation I:

$$v \cdot I_{sb} = \{kT/(\Delta Hc/\Delta ln(t))\} \qquad \text{I}$$

(k: Boltzmann constant, T: absolute temperature)

The magnetization amount $v \cdot I_{sb}$ is an index representing the magnetic moment of one particle. When this value is small, the particles are fine. The present inventors examined the magnetization amount $v \cdot I_{sb}$ and found for the first time that, when a magnetic film made of a CoPtO-based alloy was formed on a substrate through an underlayer, the particles of the material constituting the magnetic film became fine. When the particles of the material constituting the magnetic film become fine, the S/N ratio becomes high in accordance with equation II:

$$\Delta S/N = 10 \cdot \log (n_1/n_2) \qquad \text{II}$$

($n_1$, $n_2$: the numbers of particles)

In the first invention, a ratio Hc/(Mr·t) of the coercive force Hc to a product Mr·t of the residual magnetization amount of the magnetic film in planar and the thickness of the magnetic film is set to be at least 6,000. The value Hc/(Mr·t) is set to be at least 6,000 to obtain a high recording resolution and low noise.

As for the relationship between the values Mr·t and $v \cdot I_{sb}$, the ratio $Mr \cdot t / v \cdot I_{sb}$ is preferably $3.5 \times 10^{11}$ particles/cm$^2$ in consideration of the number of magnetic particles per 1 bit. In this manner, the S/N ratio increases by defining the ratio $Mr \cdot t / v \cdot I_{sb}$.

In the first invention, the thickness of the magnetic film is set to be 15 nm or less, and a coercive force rectangularity ratio S* of the magnetic film in planar is set to be 0.4 to 0.82. The thickness of the magnetic film is set to be 15 nm or less to achieve a high recording resolution. The coercive force rectangularity ratio S* of the magnetic film in planar is set to be 0.4 to 0.82 to obtain a high output power and low noise.

In the first invention, lattice matching between the material constituting the substrate and the CoPtO-based alloy through the underlayer can be achieved by approximating the average atom radius of the substrate material and that of the CoPtO-based alloy within about 3%. The two average atom radii need not always equal each other.

In the first invention, the material containing vanadium as a main constituent and constituting the underlayer means V, a V-Nb alloy, a V-Ta alloy, or a V-Nb-Ta alloy.

In the first invention, when a V film, a V-Nb alloy film, or a V-Ta alloy film is used as the underlayer, a decrease in coercive force of the CoPtO magnetic film can be suppressed. This is because the underlayer reduces deposition defects in the crystalline phase of the very thin CoPtO magnetic film formed on the underlayer, reduces the magnetic anisotropy of the CoPtO-based alloy particles, and prevents dispersion of the magnitude of the magnetic anisotropy.

In this case, when the solid solution amount of Nb or Ta to be solved in V is changed, the coercive force and the rectangularity ratio S* of the magnetic film can be controlled. Therefore, the coercive force with respect to the recording capability of the magnetic head can be optimized, and at the same time, the signal quality can be improved.

When an orientation or shape anisotropy is imparted to the underlayer, the rectangularity ratio in the magnetic characteristics of the magnetic film to which a magnetic anisotropy having an axis of easy magnetization along the circumferential direction is applied can be improved, so that the output power and recording density can be further increased. When the magnetic film has the magnetic anisotropy in planar, the magnetic aftereffect can be reduced.

A protective film made of carbon or the like or a lubricant layer made of perfluoropolyether or the like may be formed on the surface of the magnetic film.

Figure 5:
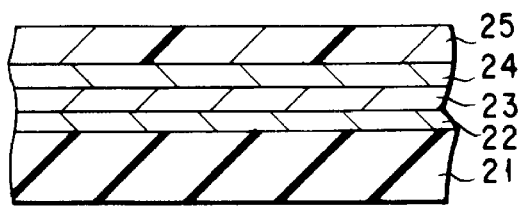
FIG. 5 is a sectional view showing a magnetic recording medium according to the second invention of the present invention.

As shown in FIG. 5, a magnetic recording medium according to the second invention of the present invention has a structure in which a magnetic film 24 is formed on a substrate 21 through a first underlayer 22 and a second underlayer 23. A protective film 25 is formed on the magnetic film 24, as needed.

In the magnetic film of the second invention, CoPtO having a hexagonal closest packed structure is grown on the crystalline region of the second underlayer, and an amorphous region containing a large amount of oxygen in CoPtO is present on the amorphous region of the second underlayer. For this reason, separation of magnetic particles in the magnetic film is promoted, so that a coercive force Hc exceeding 4,000 Oe and a value $\Delta M$ of 0.2 or less are achieved. Therefore, a magnetic recording medium which has a high line resolution, a high S/N ratio, and low noise can be provided.

In the first and second inventions, a glass substrate, a silicon substrate, a carbon substrate, or the like can be used as the substrate. The CoPtO-based alloy constituting the magnetic film means a CoPt alloy containing at least 10 atomic % of oxygen, including a CoPtO-based alloy doped with an element such as Cr, Zr, Ta, or the like. When the CoPtO-based alloy has a structure having a crystalline phase and an amorphous phase containing oxygen in an larger amount than that in the crystalline phase, the magnetic recording medium obtains an excellent signal quality, and the medium noise can be reduced. In addition, this structure is suitable as a material of a future magnetic recording medium for high-density recording because it substantially has a large crystal magnetic anisotropy.

Figure 10:
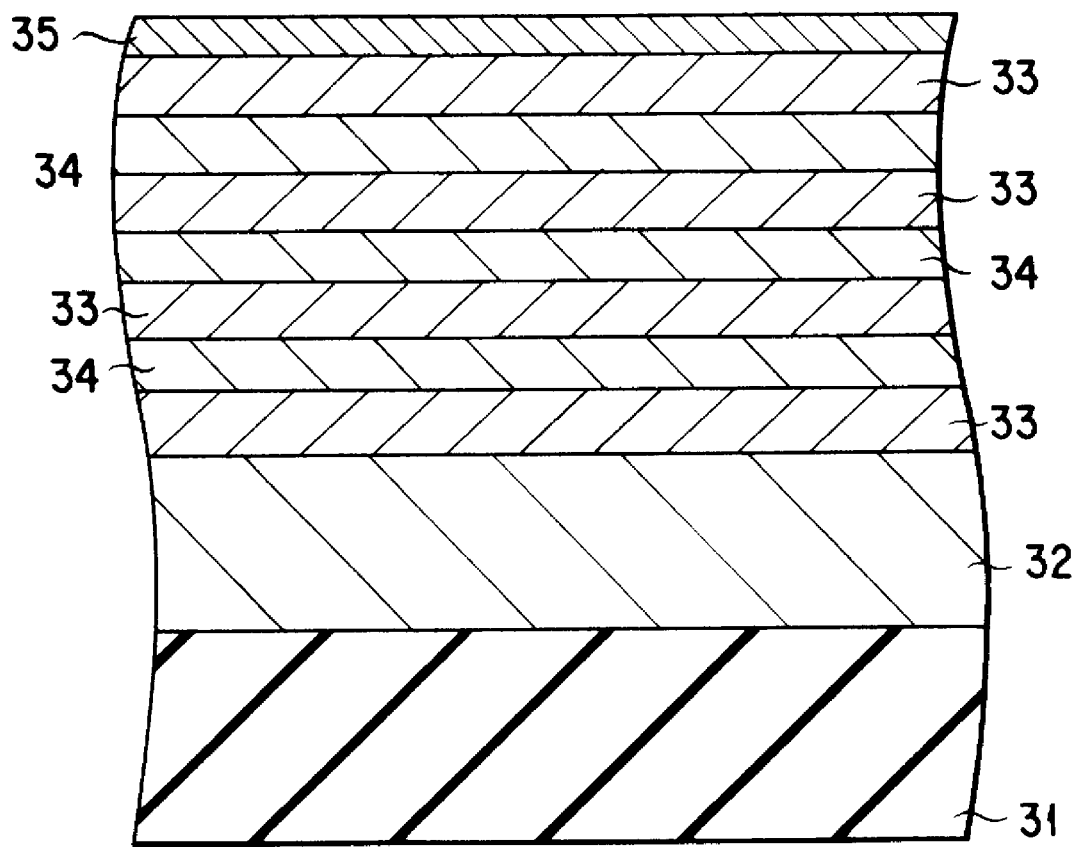
FIG. 10 is a sectional view showing a magnetic recording medium according to the third invention of the present invention.

The magnetic recording medium according to third invention of the present invention has the following structure. That is, as shown in FIG. 10, an underlayer 32 is formed on a substrate 31, and a plurality of magnetic films 33 made of a CoPtO-based alloy are laminated on the underlayer 32 with interlayers 34 respectively provided therebetween. Further, if necessary, a protection film 35 is formed on the uppermost magnetic film 34.

In the third invention, a plurality of magnetic films made of a CoPtO-based alloy are formed on the film made of vanadium or an alloy mainly containing vanadium.

In this invention, a glass substrate, a silicon substrate, a carbon substrate or the like may be used as the substrate.

The material for making the underlayer and the interlayers used for the magnetic recording medium according to the third invention is vanadium or an alloy mainly containing vanadium. The alloy mainly containing vanadium is an alloy of vanadium and other material such as Nb, Ta, Mo, W, Ni, Pt, Pd, Cu, Ag, Au, B, C, Si, Ge, Ti, Zr, Hf, Fe, Ru, Os, Co, Rb, Ir, or a mixture of any combination of these. The interlayers should preferably be of a non-magnetic type.

Further, in the third invention, an alloy containing vanadium and other metal having a radius of atom larger than that of vanadium, such as niobium, titanium or tantalum or a mixture thereof, should preferably used as the alloy mainly containing vanadium. In the case where such an alloy is used for the underlayer or the interlayers, a compression stress is applied to these layers, and therefore the resistance to damage which may be caused when it is brought into contact with the head is enhanced.

The concentration of vanadium in the alloy should preferably be at least 30 atomic %, and more preferably, 50 atomic % or more. When the concentration of vanadium falls within such a range, the coercive force rectangularity ratio S* is improved. Further, the thickness of the underlayer should preferably be 3 to 360 nm, and the thickness of the interlayers should preferably be 2 to 10 nm. When the thickness of each of these films is less than the respective one of these lower limits, or exceeds the upper limits, $I_{sb}$ is increased.

In the magnetic recording medium of the third invention, the compositions of the underlayer and the interlayers may be different one another, as long as these layers are made of vanadium or an alloy mainly containing vanadium.

In the magnetic recording medium of the third invention, it is required that at least two magnetic layers should be laminated. Each of the magnetic film is made of a CoPtO-based alloy, which is an oxygen-containing CoPt alloy. This alloy may contain an element such as Cr, Zr, Ta or Ti.

In the case where such magnetic films are formed by an epitaxial growth on a film made of vanadium or an alloy mainly containing vanadium, if a desired amount of oxygen is present within the CoPt alloy, an amorphous region having a high concentration of oxygen atoms is formed in a magnetic film. Therefore, the separation of magnetic particles is promoted, and the magnetization inversion unit of the magnetic particles is reduced. Such a phenomenon may occur in cases of other combinations than those discussed above. However, particularly, in the case where the thickness of the magnetic films is reduced, the magnetization inversion unit of magnetic particles can be reduced, with use of vanadium or an alloy mainly containing vanadium, and a CoPtO-based alloy.

Further, in the CoPtO-based alloy, Pt serves to increase the crystal magnetic anisotropy of magnetic particles.

In the CoPtO-based alloy, the concentrations of Co, Pt and 0 should preferably be 45 to 85 atomic %, 10 to 40 atomic % and 5 to 45 atomic %, respectively, and more preferably, 50 to 70 atomic %, 20 to 40 atomic % and 15 to 40 atomic %, respectively. Further, these magnetic films should preferably be made to have a thickness of 5 to 20 nm. When the composition and thickness of these magnetic films fall within the respective ranges discussed above, it is able to obtain a high coercive force and a high recording density.

In the magnetic recording medium of the third invention, a protection film may be formed on the uppermost magnetic film, if needed. The material for making the protection layer is, for example, carbon.

As described above, when a plurality of magnetic films are laminated on a substrate with interlayers made of a non-magnetic material, and provided respectively between magnetic films, the vertical magnetic anisotropy is improved due to the surface effect, and the magnetic interaction between the adjacent magnetic films is attenuated due to the interlayer. Therefore, the noise caused by the medium can be reduced. However, in the case of a general magnetic recording medium having a multilayered structure, if the thickness of magnetic films is decreased so as to improve the recording density, the magnetic interaction between magnetic particles on the plane of the magnetic film increases, thereby significantly reducing the coercive force.

By contrast, according to the magnetic recording medium of the third invention, it is possible to achieve a high coercive force even if the thickness of these magnetic films is reduced to, for example, 10 nm or less.

Examples of the present invention will be described below with reference to the accompanying drawings.

EXAMPLE 1

A V film having a thickness of 360 nm was formed on a glass substrate by sputtering. In sputtering, a V target having an outer diameter of 5 inches was used. The target-to-substrate distance was 170 mm, the sputtering pressure was 2 Pa, and the applied power was 2.5 kW.

Subsequently, a CoPtCrO film having a thickness of 5 nm–20 nm and containing 25 atomic % of oxygen was formed on the V film. In formation of the CoPtCrO film, a Co—20 atomic % Pt—3 atomic % Cr target having an outer diameter of 5 inches was used. The target-to-substrate distance was 170 mm, the sputtering pressure of Ar containing oxygen was 12 Pa, and the applied power was 120 W. For the CoPtCrO film, the sputtering time was controlled to form films with various thicknesses. In this manner, various magnetic recording media with magnetic films having different thicknesses were prepared by forming CoPtCrO films on glass substrates through V films.

In addition, an Nb film having a thickness of 21 nm was formed on a glass substrate by sputtering. In sputtering, an Nb target having an outer diameter of 5 inches was used. The target-to-substrate distance was 150 mm, the sputtering pressure was 0.6 Pa, and the applied power was 2 kW. Subsequently, a carbon film having a thickness of 9 nm was formed on the Nb film by sputtering. In sputtering, a carbon target having an outer diameter of 5 inches was used. The target-to-substrate distance was 150 mm, the sputtering pressure was 2 Pa, and the applied power was 1 kW. A CoPtCrO film having a thickness of 5 nm–20 nm and containing 25 atomic % of oxygen was formed on the Nb film by the same method as described above. In this manner, various magnetic recording media with magnetic films having different thicknesses were prepared by forming CoPtCrO films on glass substrates through carbon films and Nb films.

As a prior art, various magnetic recording media with magnetic films having different thicknesses were prepared by directly forming CoPtCrO films on glass substrates by sputtering. Formation of the CoPtCrO film was performed following the same procedures as described above.

For each of these magnetic recording media, the residual magnetization amount was measured using a vibration sample type magnetometer (VSM), and the product Mr·t of the residual magnetization amount and the thickness of the magnetic film was calculated. In addition, the magnetization amount $v \cdot I_{sb}$ of the magnetic film (the magnetization amount of the magnetic particles) was calculated on the basis of the measurement result by the vibration sample type magnetometer (VSM). FIG. 2 is a graph showing the relationship between the product Mr·t and the magnetization amount $v \cdot I_{sb}$ calculated in the above manner.

As can be apparent from FIG. 2, the magnetization amount $v \cdot I_{sb}$ of the magnetic recording medium (CoPtCrO/V/Sub or CoPtCrO/C/Nb/Sub) of the present invention was $0.2 \times 10^{-14}$ emu or less. On the other hand, the magnetization amount $v \cdot I_{sb}$ of the conventional magnetic recording medium (CoPtCrO/Sub) was $0.3 \times 10^{-14}$ emu or more. Particularly, when the value Mr·t was 0.6 memu/cm² or less, the value $v \cdot I_{sb}$ was as large as almost $1.0 \times 10^{-14}$ emu.

In the magnetic recording medium of the present invention, the value $Mr \cdot t / v \cdot I_{sb}$ was $5.5 \times 10^{11}$ particles/cm² or more. However, in the conventional magnetic recording medium, the value $Mr \cdot t / v \cdot I_{sb}$ was $3.0 \times 10^{11}$ particles/cm² or less. Particularly, when the value Mr·t was 0.6 memu/cm² or less, the value $v \cdot I_{sb}$ abruptly decreases.

In the magnetic recording medium of the present invention, when the value Mr·t was 0.6 memu/cm² or less, the S/N ratio was 36 dB. However, in the conventional magnetic recording medium, when the value Mr·t was 0.6 memu/cm² or less, the S/N ratio was 20 dB or less.

EXMAPLE 2

A V film having a thickness of 360 nm was formed on a glass substrate by sputtering in a similar manner as in Example 1. Subsequently, a CoPtO film containing 25 atomic % of oxygen was formed on the V film in a similar manner as in Example 1 except for using a Co—24 atomic % Pt target replaced by the Co—20 atomic % Pt—3 atomic % Cr target. For the CoPtO film, the sputtering time was controlled to form films with various thicknesses. In this manner, various magnetic recording media with magnetic films having different thicknesses were prepared by forming CoPtO films on glass substrates through V films.

As a prior art, various magnetic recording media with magnetic films having different thicknesses were prepared by directly forming CoPtO films on glass substrates by sputtering. Formation of the CoPtO film was performed by the same method as described above.

For each of these magnetic recording media, the magnetic characteristics were measured using a vibration sample type magnetometer (VSM) to obtain the residual magnetization amount, the coercive force, and the coercive force rectangularity ratio. Using the result of the obtained residual magnetization amount and coercive force, the relationship between the product Mr·t of the residual magnetization amount and the thickness of the magnetic film, and the coercive force Hc and the coercive force rectangularity ratio S* is shown in FIG. 3.

As can be apparent from FIG. 3, in the magnetic recording medium of the present invention using the V film as the underlayer, when the thickness t of the magnetic film was 15 nm, the product Mr·t of the residual magnetization amount and the thickness of the magnetic film was 0.48 memu/cm², and the coercive force Hc was 2,750 Oe. When the thickness t was 9.8 nm, the value Mr·t was 0.35 memu/cm², and the coercive force Hc was 2,600 Oe. When the thickness t was 6 nm, the value Mr·t was 0.15 memu/cm², and the coercive force Hc was 1,900 Oe.

The magnetic film of the magnetic recording medium of the present invention was analyzed with an analytical electron microscope. It was confirmed that the texture had a crystalline phase and an amorphous phase, and a large amount of oxygen was segregated in the amorphous phase.

The coercive force rectangularity ratio S* was a satisfactory value of 0.4 to 0.6.

In the conventional magnetic recording medium constituted by directly forming the magnetic film on the glass substrate, when the thickness t was 17 nm, the product Mr·t was 0.9 memu/cm$^2$, and the coercive force Hc was 2,100 Oe, which posed no problem. However, when the thickness t was 13.8 nm, the value Mr·t was 0.62 memu/cm$^2$, and the coercive force Hc was 1,760 Oe, and when the thickness t was 10 nm, the value Mr·t was 0.56 memu/cm$^2$, and the coercive force Hc was 310 Oe. Therefore, when the magnetic film becomes thin, the coercive force is found to abruptly decrease.

EXAMPLE 3

A V film having a thickness of 120 nm was formed on a glass substrate by sputtering. In sputtering, a V target having an outer diameter of 5 inches was used. The target-to-substrate distance was 170 mm, the sputtering pressure was 0.65 Pa, and the applied power was 2.5 kW.

Subsequently, a CoPtCrO film was formed on the V film. In formation of the CoPtCrO film, a Co—20 atomic % Pt—3 atomic % Cr target having an outer diameter of 5 inches was used. The target-to-substrate distance was 170 mm, the sputtering pressure of Ar containing oxygen was 12 Pa, and the applied power was 200 W. For the CoPtCrO film, the sputtering time was controlled to form films with various thicknesses. In this manner, various magnetic recording media with magnetic films having different thicknesses were prepared by forming CoPtCrO films on glass substrates through V films.

As a prior art, various magnetic recording media with magnetic films having different thicknesses were prepared by directly forming CoPtCrO films on glass substrates by sputtering. Formation of the CoPtCrO film was performed following the same procedures as described above.

For each of these magnetic recording media, the magnetic characteristics were measured using a vibration sample type magnetometer (VSM) to obtain the residual magnetization amount, the coercive force, and the coercive force rectangularity ratio. Using the result of the obtained residual magnetization amount and coercive force, the relationship between the product Mr·t of the residual magnetization amount and the thickness of the magnetic film, and the coercive force Hc and the coercive force rectangularity ratio S* is shown in FIG. 4.

Figure 4:
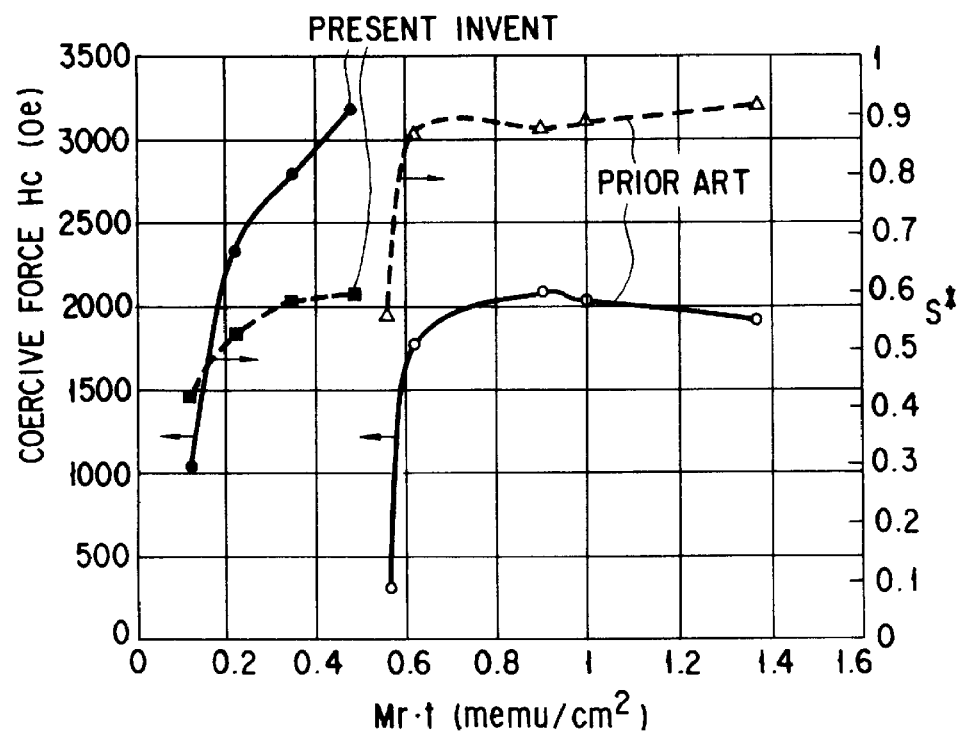
FIG. 4 is a graph showing the magnetic characteristics of the magnetic recording medium according to the first invention of the present invention.

As can be apparent from FIG. 4, in the magnetic recording medium of the present invention using the V film as the underlayer, when the thickness t of the magnetic film was 15 nm, the product Mr·t of the residual magnetization amount and the thickness of the magnetic film was 0.48 memu/cm$^2$, and the coercive force Hc was 3,200 Oe. When the thickness t was 9 nm, the value Mr·t was 0.35 memu/cm$^2$, and the coercive force Hc was 2,800 Oe. When the thickness t was 7 nm, the value Mr·t was 0.22 memu/cm$^2$, and the coercive force Hc was 2,350 Oe.

The magnetic film of the magnetic recording medium of the present invention was analyzed with an analytical electron microscope. It was confirmed that the texture had a crystalline phase and an amorphous phase, and a large amount of oxygen was segregated in the amorphous phase. The coercive force rectangularity ratio S* was a satisfactory value of 0.4 to 0.65.

In the conventional magnetic recording medium constituted by directly forming the magnetic film on the glass substrate, when the thickness t was 24 nm, the product Mr·t was 0.9 memu/cm$^2$, and the coercive force Hc was 2,100 Oe, which posed no problem. However, when the thickness t was 8 nm, the value Mr·t was 0.58 memu/cm$^2$, and the coercive force Hc was 1,700 Oe, and when the thickness t was 6 nm, the value Mr·t was 0.55 memu/cm$^2$, and the coercive force Hc was 300 Oe. Therefore, when the magnetic film becomes thin, the coercive force is found to abruptly decrease. In addition, the coercive force rectangularity ratio S* was very high and deviated from the practical level, i.e., falls outside the optimum range of 0.4 to 0.82.

When a Cr film was used as an underlayer, and the value Mr·t was 0.5 or less, the coercive force was 1,100 Oe, and the rectangularity ratio was 0.3. As for a CoPt/V film structure without oxygen, when the film thickness was small, i.e., when the value Mr·t was 0.5 or less, noise was large.

EXAMPLE 4

A V-Nb film having a thickness of 50 nm was formed on a glass substrate by sputtering. In sputtering, a V target and an Nb target, both of which had an outer diameter of 5 inches, were used. The target-to-substrate distance was 120 mm, the sputtering pressure was 0.3 Pa. For the V-Nb film, the applied power in sputtering was controlled to form films having various compositions.

Subsequently, a CoPtCrO film having a thickness of 12 nm was formed on the V-Nb film. In formation of the CoPtCrO film, a Co—26 atomic % Pt—3 atomic % Cr target having an outer diameter of 5 inches was used. The target-to-substrate distance was 200 mm, the sputtering pressure of Ar containing oxygen was 10 Pa, and the applied power was 2.5 kW. In this manner, various magnetic recording media with underlayer materials having different compositions were prepared by forming CoPtCrO films on glass substrates through V-Nb films.

As a prior art, a magnetic recording medium was prepared by directly forming a CoPtCrO film on a glass substrate by sputtering. Formation of the CoPtCrO film was performed following the same procedures as described above.

For each of these magnetic recording media, the magnetic characteristics were measured using a vibration sample type magnetometer (VSM) to obtain the residual magnetization amount, the coercive force, and the coercive force rectangularity ratio. As a result, a magnetic recording medium using an Nb underlayer containing 10 atomic % of V exhibited the maximum coercive force Hc of 2,800 Oe which was larger than that of a magnetic recording medium using a V film as an underlayer (2,200 Oe). The value Mr·t was 0.36 memu/cm$^2$.

A magnetic recording medium using a V-Nb film containing 10 atomic % or more of Nb as an underlayer exhibited a small coercive force. With an Nb content up to 10 atomic %, the coercive force rectangularity ratio S* increased to 0.65 to 0.70. When the Nb content further increased, the coercive force rectangularity ratio S* decreased.

On the other hand, in the conventional magnetic recording medium constituted by directly forming the magnetic film on the glass substrate, the coercive force was as small as 500 Oe.

In Example 4, the substrate was heated by an infrared lamp from the upper surface side while forming a temperature gradient from the inner circumference to the outer circumference of the substrate. The V-Nb film was formed while rotating the substrate, and the CoPtCrO film was formed on the resultant structure. With this process, a magnetic anisotropy having an axis of easy magnetization along the circumferential direction was imparted to the magnetic film. At this time, the coercive force rectangularity ratio S* increased to 0.7 to 0.82 within the optimum range.

EXAMPLE 5

An Nb film having a thickness of 21 nm was formed as a first underlayer on a glass substrate by sputtering. In sputtering, an Nb target having an outer diameter of 5 inches was used. The target-to-substrate distance was 170 mm, the sputtering pressure was 2 Pa, and the applied power was 2.5 kW. The 21-nm thickness of the Nb film is a value for obtaining a sufficient crystal orientation.

Subsequently, a carbon film having a thickness of 10 nm was formed as a second underlayer on the Nb film by sputtering. In sputtering, a C target having an outer diameter of 5 inches was used. The target-to-substrate distance was 170 mm, the sputtering pressure was 2 Pa, and the applied power was 600 W. For the carbon film, the sputtering time was controlled to form films with various thicknesses.

Subsequently, a CoPtO film having a thickness of 20 nm was formed as a magnetic film on the carbon film by sputtering. In sputtering, a Co—24 atomic % Pt target having an outer diameter of 5 inches was used. The target-to-substrate distance was 170 mm, the sputtering pressure of Ar containing oxygen was 8 Pa, and the applied power was 400 W.

Finally, a carbon film having a thickness of 10 nm was formed as a protective film on the CoPtO film by sputtering. In sputtering, a C target having an outer diameter of 5 inches was used. The target-to-substrate distance was 170 mm, the sputtering pressure of Ar was 2 Pa, and the applied power was 600 W.

For each of these various magnetic recording media with second underlayers having different thicknesses, the coercive force was measured using a vibration sample type magnetometer (VSM). The measurement result is shown in FIG. 6 and Table 1.

TABLE 1

| Table | Nb Film Thickness (nm) | C film Thickness (nm) | CoPtO Film Thickness (nm) | Coercive Force (Oe) | ΔM |
|---|---|---|---|---|---|
| Sample 1 | 21 | 0 | 24 | 648 | 0.4 |
| Sample 2 | 21 | 8 | 24 | 4721 | 0.1 |
| Sample 3 | 21 | 13 | 14 | 4758 | 0.1 |
| Sample 4 | 21 | 13 | 24 | 4635 | 0.1 |
| Sample 5 | 21 | 44 | 24 | 4768 | 0.1 |

Figure 6:
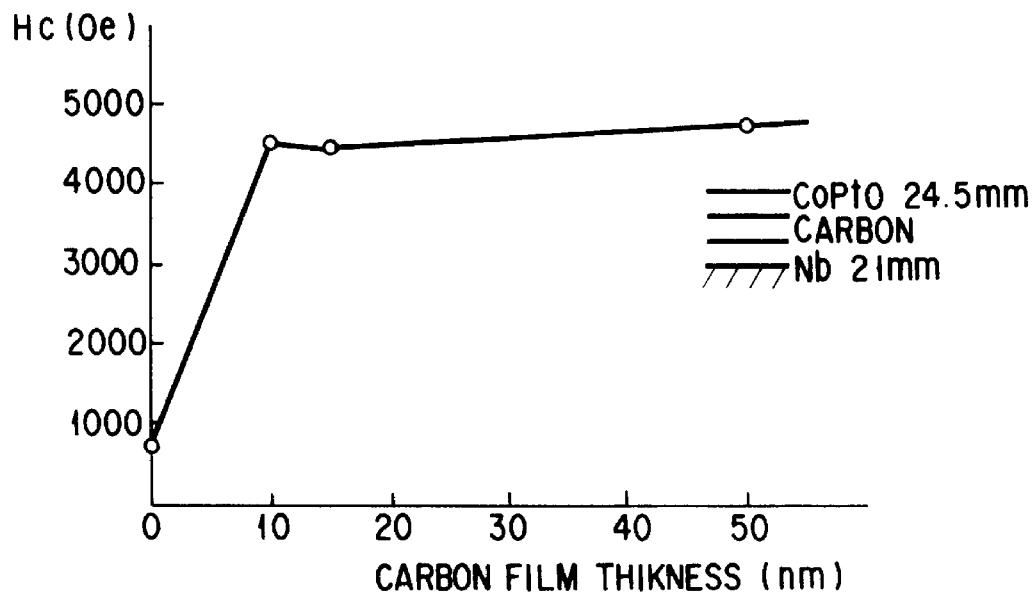
FIG. 6 is a graph showing the dependency of the coercive force of the magnetic recording medium according to the second invention of the present invention on the thickness of the second underlayer.

As can be apparent from FIG. 6 and Table 1, the magnetic recording media of the present invention (Samples 2 to 5), each having a carbon film as the second underlayer, had a very large coercive force Hc, and the value ΔM was small. To the contrary, the magnetic recording medium without any carbon film (Sample 1) had a very small coercive force Hc, and the value ΔM was large.

The carbon film may also have an effect of preventing Nb from being diffused in the CoPtO film, and this effect may also contribute to an increase in the coercive force Hc.

EXAMPLE 6

An Nb film having a thickness of 21 nm was formed as a first underlayer on a glass substrate by sputtering. In sputtering, an Nb target having an outer diameter of 5 inches was used. The target-to-substrate distance was 170 mm, the sputtering pressure was 0.6 Pa, and the applied power was 2.5 kW. The 21-nm thickness of the Nb film is a value for obtaining a sufficient crystal orientation.

Subsequently, a carbon film having a thickness of 13 nm was formed as a second underlayer on the Nb film by sputtering. In sputtering, a C target having an outer diameter of 5 inches was used. The target-to-substrate distance was 120 mm, the sputtering pressure was 2 Pa, and the applied power was 600 W. For the carbon film, the sputtering time was controlled to form films with various thicknesses.

Subsequently, a CoPtO film having a thickness of 24.5 nm was formed as a magnetic film on the carbon film by sputtering. In sputtering, a Co—24 atomic % Pt target having an outer diameter of 5 inches was used. The target-to-substrate distance was 170 mm, the sputtering pressure of Ar containing oxygen was 12 Pa, and the applied power was 120 W. For the CoPtO film, the sputtering time was controlled to form films with various thicknesses.

Finally, a carbon film having a thickness of 8 nm was formed as a protective film on the CoPtO film by sputtering. In sputtering, a Co—24 atomic % Pt target having an outer diameter of 5 inches was used. The target-to-substrate distance was 170 mm, the sputtering pressure of Ar was 2 Pa, and the applied power was 600 W.

For each of these various magnetic recording media with second underlayers having different thicknesses, the coercive force was measured using a vibration sample type magnetometer (VSM). The measurement result is shown in FIG. 7 and Table 2.

TABLE 2

| | Nb Film Thickness (mn) | C film Thickness (nm) | CoPtO Film Thickness (nm) | Coercive Force (Oe) | ΔM |
|---|---|---|---|---|---|
| Sample 6 | 21 | 13 | 8 | 59 | — |
| Sample 7 | 21 | 13 | 12 | 233 | — |
| Sample 3 | 21 | 13 | 14 | 4758 | 0.1 |
| Sample 4 | 21 | 13 | 24 | 4635 | 0.1 |

Figure 7:
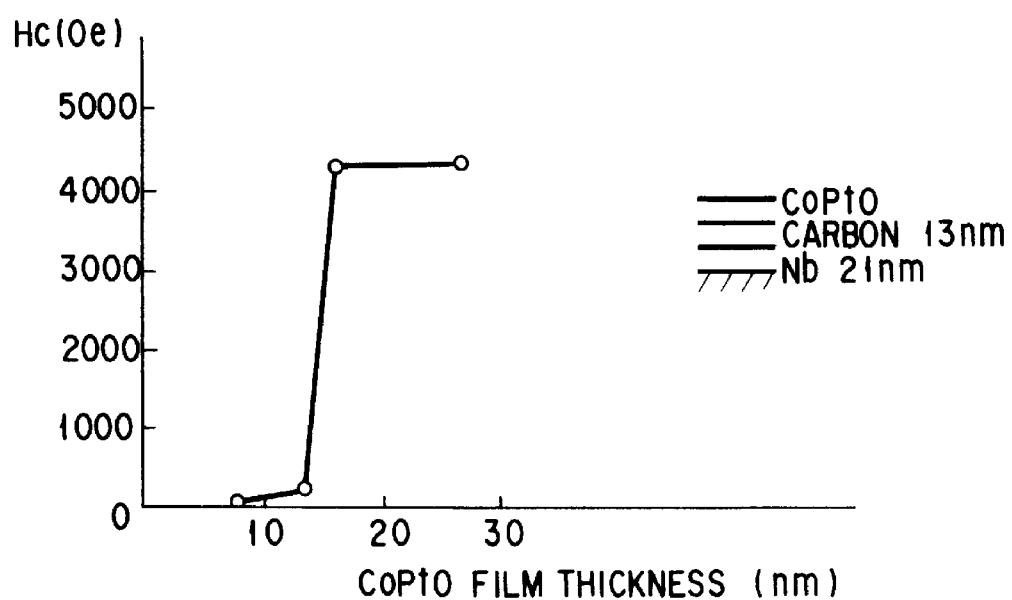
FIG. 7 is a graph showing the dependency of the coercive force of the magnetic recording medium according to the second invention of the present invention on the thickness of the magnetic film.

As can be apparent from FIG. 7 and Table 2, the magnetic recording media each having a CoPtO film with a thickness of 14 nm or more (Samples 3 and 4) exhibited a very large coercive force Hc, and the value ΔM was small.

FIG. 8 is a transmission electron microscopic image of the surface of a CoPtO film formed on an Nb film. FIG. 9 is a transmission electron microscopic image of the surface of a CoPtO film formed on an Nb film through a carbon film. As is apparent from FIGS. 8 and 9, the texture shown in FIG. 9 has an amorphous phase spread between the magnetic particles. Therefore, the CoPtO film formed on the Nb film through the carbon film may decrease the exchange interaction between the magnetic particles, and this effect may increase the coercive force Hc and decreases the value ΔM.

In Examples 5 and 6, the Nb film is used as the first underlayer, and the carbon film is used as the second underlayer. However, even when a material containing at least one element selected from the group consisting of Nb, V, and Cr is used for the first underlayer, the same effect as described above can be obtained. In addition, even when a material containing at least one element selected from the group consisting of boron, boron nitride, and silicon dioxide is used for the second underlayer, the same effect as described above can be obtained.

As has been described above, the magnetic recording medium according to the first invention of the present invention comprises an underlayer formed on a substrate, and a magnetic film made of a CoPtO-based alloy and formed on the underlayer. Even when the magnetic film is thin, i.e., even when the product of the residual magnetization amount (Mr) of the magnetic film and the thickness (t) of the magnetic film is small, the magnetic recording medium exhibits a large coercive force and is suitable for high-density recording.

With this arrangement, the magnetization transition width of the magnetic recording medium can be decreased in recording with a magnetic head, so that the recording density can be increased. In addition, when the magnetization transition width is small, noise from the magnetization transition region is reduced, so that the S/N ratio of the magnetic recording medium is increased. Furthermore, when the magnitude of the magnetic anisotropy in the magnetic film is uniformed, the influence of a thermal disturbance is decreased.

The magnetic recording medium according to the second invention of the present invention comprises a first underlayer formed on a substrate and made of a crystal having a crystal structure for forming a body-centered cubic lattice, a second underlayer formed on the first underlayer and made of an amorphous material, and a magnetic film formed on the second underlayer and made of a CoPtO-based alloy. Since the magnetic particles in the magnetic film are magnetically separated, the magnetic recording medium exhibits a large coercive force and is suitable for high-density recording.

Next, an example of the magnetic recording medium according to the third invention will now be described.

EXAMPLE 7

A vanadium film having a thickness of 360 nm and serving as an underlayer was formed on a glass substrate by sputtering. In sputtering, a vanadium target having an outer diameter of 5 inches was used. The target-to-substrate distance was 125 mm, the sputtering pressure was 2 Pa, and the applied power was 2.5 kW.

Subsequently, a CoPtCrO film having a thickness of 10 nm and serving as a magnetic film, was formed by sputtering on an underlayer in an argon atmosphere containing 0.01 volume% of oxygen at a pressure of 12 Pa. In this sputtering, a target having an outer diameter of 5 inches was used. The target-to-substrate distance was 125 mm, and the applied power was 0.2 kW.

On the magnetic film, a vanadium film having a thickness of 4 nm was formed as an interlayer in the same manner as that of the formation of the underlayer, and further another magnetic film was formed on this interlayer as described above. On the top of this magnetic film, a carbon film having a thickness of 8 nm was formed as a protection film. Thus, a magnetic recording medium having a two-layered structure in which two magnetic layers were laminated, was prepared.

Then, a magnetic recording medium having a three-layered structure was prepared in the same manner as that for the preparation of the magnetic recording medium of the two-layered structure described above, except that the thickness of each of the magnetic films was set to 6.7 nm, and three magnetic films were laminated. Further, a magnetic recording medium having a four-layered structure was prepared in the same manner as that for the preparation of the magnetic recording medium of the two-layered structure described above, except that the thickness of each of the magnetic films was set to 5 nm, and four magnetic films were laminated.

Furthermore, a magnetic recording medium having a single-layered structure was prepared in the same manner as that for the preparation of the magnetic recording medium of the two-layered structure described above, except that no interlayer was provided and the thickness of the magnetic film was set to 20 nm. Then, for comparison, a magnetic recording medium having a four-layered structure was prepared in the same manner as that for the preparation of the magnetic recording medium of the two-layered structure described above, except that the thickness of each of the magnetic film was set to 5 nm, and interlayers having a thickness of 6 nm, which was made of chromium in place of vanadium, were used.

Furthermore, a magnetic recording medium having a four-layered structure was prepared in the same manner as that for the preparation of the magnetic recording medium of the two-layered structure described above, except that the thickness of each of the magnetic film was set to 5 nm, and a film made of an alloy containing 50 atomic % of vanadium and 50 atomic % of niobium was formed in place of the vanadium film by using the V-Nb target in place of the vanadium target.

For each of these magnetic recording media thus prepared, the coercive force was measured using a vibration sample type magnetometer (VSM). The results were summarized in Table 3.

TABLE 3

| | CoPtO Film Thickness (nm) | Number of Magnetic Films | Underlayer and Interlayer material | Interlayer Thickness (nm) | Coercive Force (Oe) |
|---|---|---|---|---|---|
| Sample 8 | 10.0 | 2 | V | 4.0 | 2240 |
| Sample 9 | 6.7 | 3 | V | 4.0 | 1880 |
| Sample 10 | 5.0 | 4 | V | 4.0 | 1840 |
| Sample 11 | 20.0 | 1 | V (No Interlayer) | — | 2900 |
| Sample 12 | 5.0 | 4 | Cr | 6.0 | 1000 |
| Sample 13 | 5.0 | 4 | 50 atomic % V – 50 atomic % Nb | 4.0 | 1810 |

These magnetic recording media were prepared such that the products of the thickness of the magnetic films and the number of magnetic films were equal to each other among all these media. In other words, the magnetic recording media were made to have the same total thickness of the magnetic films in each case.

The comparison between the samples 8 to 10 of the present invention indicates that the coercive force per one magnetic film decreases as the thickness of the film is reduced in these samples. However, the coercive force exceeds 1800 Oe even in the case where the thickness of one film is 5 nm. In reverse, the ratio of the coercive force with respect to the thickness of the film significantly increases. Therefore, with results for the magnetic recording media of the Samples 8 to 10, it can be concluded that the coercive force of magnetic recording medium can be increased and the recording density can be enhanced by increasing the number of lamination of magnetic films and decreasing the thickness of each magnetic film. Further, due to the reduction in size of magnetic particles, a low noise can be achieved.

The comparison between the magnetic recording media of the Samples 10 and 12 of the present invention, and that of the Sample 13 indicates that the magnetic recording media of the Samples 10 and 13 exhibit coercive forces approximately equal to each other, which are higher than the coercive force of the magnetic recording medium of the Sample 12. It is understood from this result that a high coercive force can be obtained when the underlayer and the interlayer are made of vanadium or an alloy mainly containing vanadium.

As described above, the magnetic recording medium according to the third invention of the present invention, includes an underlayer formed on a substrate, a plurality of magnetic films laminated on the underlayer and interlayers provided respectively between the plurality of magnetic films, and the underlayer and the interlayers are made of vanadium or an alloy mainly containing vanadium. With this structure, even if the magnetic films are thinned, the magnetic interaction between magnetic particles within the magnetic film in planer can be inhibited, thus making it possible to achieve a high coercive force.

We claim:

1. A magnetic recording medium comprising:
   an underlayer formed on a substrate and made of a material containing vanadium as a main constituent, and
   a magnetic film formed on said underlayer and made of CoPtO-based alloy, wherein said magnetic film has a crystalline phase and an amorphous phase containing oxygen in a larger amount than that in said crystalline phase.

2. A medium according to claim 1, wherein a material constituting said substrate is lattice-matched with the CoPtO-based alloy through said underlayer.

3. A medium according to claim 1, wherein a magnetization amount $v \cdot I_{sb}$ of said magnetic film satisfies $0 < v \cdot I_{sb} \leq 0.3 \times 10^{-14}$ emu.

4. A medium according to claim 3, wherein a ratio $(Mr \cdot t / v \cdot I_{sb})$ of a product $Mr \cdot t$ of a residual magnetization amount of said magnetic film in planar and a thickness of said magnetic film to the magnetization amount $v \cdot I_{sb}$ of said magnetic film is not less than $3.5 \times 10^{11}$ particles/cm$^2$.

5. A medium according to claim 1, wherein a ratio $Hc/(Mr \cdot t)$ of a coercive force Hc to a product $Mr \cdot t$ of a residual magnetization amount of said magnetic film in planar and a thickness of said magnetic film is at least 6,000.

6. A medium according to claim 1, wherein a thickness of said magnetic film is not more than 15 nm, and a coercive force rectangularity ratio S* of said magnetic film in planar is 0.4 to 0.82.

7. A medium according to claim 1, wherein said magnetic film has a magnetic anisotropy in planar.

8. A magnetic medium according to claim 1, wherein the CoPtO-based alloy constituting said magnetic film contains at least 10 atomic % of oxygen.

9. A magnetic recording medium comprising a first underlayer formed on a substrate and made of a crystal having a crystal structure for forming a body-centered cubic lattice, a second underlayer formed on said first underlayer and made of an amorphous material, and a magnetic film formed on said second underlayer and made of a CoPtO-based alloy.

10. A medium according to claim 9, wherein said first underlayer is formed on said substrate to form a plurality of islands.

11. A medium according to claim 9, wherein a material constituting said first underlayer contains at least one element selected from the group consisting of niobium, vanadium, and chromium.

12. A medium according to claim 9, wherein a material constituting said second underlayer contains at least one material selected from the group consisting of carbon, boron, boron nitride, and silicon dioxide.

13. A magnetic recording medium comprising:
    an underlayer formed on a substrate;
    a plurality of magnetic films made of a CoPtO-based alloy and laminated on said underlayer; and
    an interlayer respectively provided between each of said magnetic films laminated,
    wherein said underlayer and said interlayer(s) are made of vanadium or an alloy mainly containing vanadium, and
    wherein each of said magnetic films has a crystalline phase and an amorphous phase containing oxygen in a larger amount than that in said crystalline phase.

14. A medium according to claim 13, wherein said CoPtO-based alloy contains 5 to 45 atomic % of oxygen.

15. A medium according to claim 13, wherein said CoPtO-based alloy contains 45 to 85 atomic % of Co and 10 to 40 atomic % of Pt.

16. A medium according to claim 13, wherein at least one of said underlayer and said interlayer(s) is made of vanadium.

17. A medium according to claim 13, wherein at least one of said underlayer and said interlayer(s) is made of an alloy containing at least 30 atomic % of vanadium.

18. A medium according to claim 13, wherein at least one of said underlayer and said interlayer(s) is made of an alloy mainly containing vanadium, and said alloy contains a material selected form the group consisting of niobium, titanium, tantalum and mixtures thereof.

19. A medium according to claim 13, wherein a thickness of said magnetic films is 5 to 20 nm.

20. A magnetic recording medium comprising:
    an underlayer formed on a substrate;
    a plurality of magnetic films made of a CoPtO-based alloy and laminated on said underlayer; and
    an interlayer respectively provided between each of said magnetic films laminated,
    wherein said underlayer and said interlayer(s) are made of vanadium or an alloy mainly containing vanadium, at least one of said underlayer and said interlayer(s) is made of an alloy mainly containing vanadium, and said alloy contains a material selected form the group consisting of niobium, titanium, tantalum and mixtures thereof.

21. A medium according to claim 20, wherein said CoPtO-based alloy contains 5 to 45 atomic % of oxygen.

22. A medium according to claim 20, wherein said CoPtO-based alloy contains 45 to 85 atomic % of Co and 10 to 40 atomic % of Pt.

23. A medium according to claim 20, wherein at least one of said underlayer and said interlayer(s) is made of vanadium.

24. A medium according to claim 20, wherein at least one of said underlayer and said interlayer(s) is made of an alloy containing at least 30 atomic % of vanadium.

25. A medium according to claim 20, wherein a thickness of said magnetic films is 5 to 20 nm.

* * * * *